United States Patent [19]

Koontz, Jr.

[11] 4,401,496

[45] Aug. 30, 1983

[54] VENEER SALVAGE TECHNIQUE

[75] Inventor: Ernest T. Koontz, Jr., Thomasville, N.C.

[73] Assignee: Armstrong World Industries, Inc., Lancaster, Pa.

[21] Appl. No.: 458,187

[22] Filed: Jan. 17, 1983

Related U.S. Application Data

[63] Continuation of Ser. No. 320,298, Nov. 12, 1981, abandoned.

[51] Int. Cl.[3] ........................ B32B 31/08; B32B 31/10

[52] U.S. Cl. .................................... 156/182; 144/344; 144/345; 144/346; 156/256; 156/264; 156/266; 156/270; 156/304.1; 156/324; 156/558; 156/559

[58] Field of Search ............... 156/157, 182, 256, 264, 156/263, 265, 266, 270, 304.1, 324, 517, 544, 546, 558, 559; 144/344, 345, 346, 352

[56] References Cited

U.S. PATENT DOCUMENTS

| | | | |
|---|---|---|---|
| 2,642,835 | 6/1953 | Winkel | 156/559 |
| 2,821,221 | 1/1958 | Jacquier et al. | 156/558 |
| 3,436,290 | 4/1969 | Reissner | 156/304.1 |
| 3,970,497 | 7/1976 | Glover | 144/352 |

*Primary Examiner*—Michael G. Wityshyn

[57] ABSTRACT

A technique for salvaging scrap veneer wherein scrap veneer is cut to a common width. The cut veneer will then be cut into common lengths and fed to a number of butt jointing machines. These butt jointing machines will end joint the pieces and feed out parallel ribbons of butt jointed veneer. These ribbons will then be fed to a series of splicing machines which will splice the ribbons together to form sheets made of small uniform size pieces of veneer. The sheets may then be fastened to a backing material.

2 Claims, 2 Drawing Figures

VENEER SALVAGE TECHNIQUE

CROSS-REFERENCE TO RELATED APPLICATION

This is a continuation of application Ser. No. 320,298, filed Nov. 12, 1981, now abandoned.

BACKGROUND OF THE INVENTION

1. Field of the Invention

The invention is directed to a veneering technique and, more specifically, to a technique for salvaging scrap pieces of veneer.

2. Description of the Prior Art

U.S. Pat. No. 1,916,134 discloses a process for rapid edge glueing of wood sheets. It should be noted that the object of the invention is to make it possible to edge glue green veneer as well as dry veneer and produce economical edge glueing so that it is possible to salvage veneer material formerly wasted.

SUMMARY OF THE INVENTION

The invention is directed to a process for salvaging scrap veneer to form reuseable face veneer comprising the steps of first cutting the scrap veneer into a plurality of identical size strips, such strips ranging in size from 1" to 1½" wide and 6" to 24" long. Of the plurality of strips to be fastened together, all will be the same size but from one lot of strips to the next lot of strips which are assembled together their sizes could vary within the ranges given above. The strips of identical size pieces of veneer are fed to a butt jointer to fasten together the strips of veneer at their shortest dimension to form a ribbon of veneer material. A plurality of ribbons of veneer material would be formed and subsequently one joins together said ribbons of veneer by an edge jointing machine or an edge banding jointer to form a continuous sheet of glued up face veneer formed from a plurality of identical size small pieces of veneer butt jointed and edge jointed together.

DESCRIPTION OF THE PREFERRED EMBODIMENT

Figure 1:
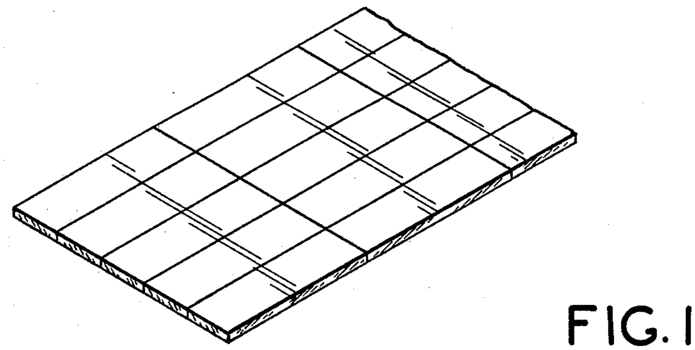
FIG. 1 is a view of one veneer arrangement.

Veneering is used extensively in the furniture art to form the finished surface of many furniture components. Veneering is relatively an expensive material and the needed pieces of veneering are normally cut from large sheets of veneer by a conventional veneer cutting machine. These pieces of veneer, cut to the required size, are then laid upon a base material. The veneered base material becomes a portion of a furniture piece. Once the piece of veneer is placed upon the backing sheet, there is very little waste with regard to the veneer. However, in the operation of cutting the pieces of veneer to the required size it is often possible that 50% of the original veneer can be lost as scrap in the cutting operation. Often this scrap veneer becomes fuel for furnaces and turns out to be almost a total lost. Salvaging of this veneer scrap would provide a substantial cost saving in the furniture industry.

Techniques for fastened together pieces of veneer along their ends and sides are conventional in the art and machinery is sold for the sole purpose of jointing together pieces of veneer to convert individual pieces of veneer into a sheet or ribbon of veneer. Normally the pieces of veneer which are joined together are 3" to 8" in width and 2' or greater in length so that the pieces of veneer when placed on a backing will simulate the normal size pieces of wood which would be used to form a furniture product.

The invention herein is a technique to utilize the scrap veneer and find a means of converting the scrap pieces into a larger piece of veneer which will have some utilization in the art.

Because the pieces of scrap veneer will be of many sizes and shapes, the pieces of scrap veneer are carefully cut up into a plurality of identical size strips. Within one lot of veneer that one is working with the strips will be cut into one size ranging from 1" to 1½ wide and 6" and 24" long. Depending upon the nature of the scrap veneer it could be possible that a plurality of 1"×6" pieces could be made up. Then again, it is possible that pieces 1¼"×24" long could be made up. Finally, it is possible that a plurality of different size pieces could be made up, but the pieces all of the same size will be grouped in lots of identical size. These lots of identically sized pieces of veneer would then be fed to a conventional butt jointer to fasten together the ends of the veneer strips. The ends of the veneer strips are the portions of the veneer strips which have the shortest dimension and are normally the side of the veneer to which the grain of the wood is perpendicular. The butt jointer will fasten together the strips of veneer at the shortest dimension to form a ribbon of veneer material which will be somewhere between 1" to 1½" wide. A plurality of ribbons will be joined together by a conventional edge banding jointer to form a continuous sheet of glued up face veneer formed from a plurality of identical size small pieces of veneer butt jointed and edge jointed together. The continuous sheet of glued up veneer could range in size anywhere from 8" to 36" in width. The end product would have any number of different surface designs.

Figure 2:
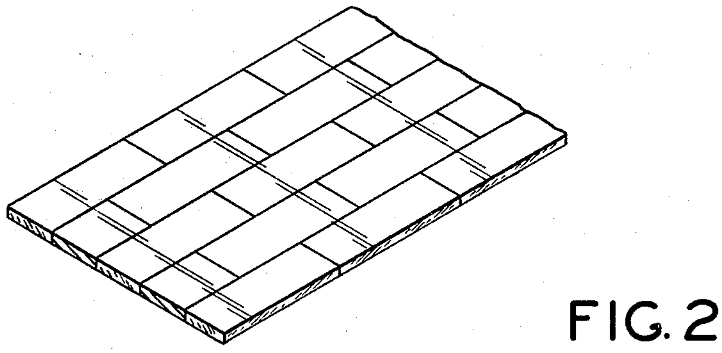
FIG. 2 is a view of another veneer arrangement.

In FIG. 1 there is shown an arrangement of veneers wherein the pieces are positioned in a side by side relationship. In FIG. 2 there is shown arrangement of the pieces wherein they are in a staggered relationship. Any number of different relationships of the pieces of veneer could be put together. FIG. 2 is typical of an arrangement of wood pieces being put together in a so-called modified butcher block form and currently sold today as a style of wood design for tabletops. The continuing sheet of veneer so formed can then be cut to size and placed upon any conventional backing material. Such a backing material could be used to form a uniquely designed tabletop, could be used as a back wall for a cabinet or any other use in a furniture component wherein the small piece design would blend in with the furniture component.

What is claimed is:

1. A process for salvaging scrap veneer to form reusable face veneer comprising the steps of:

(a) cutting the scrap veneer into a plurality of identical size strips, such strips can range in size from 1" to 1½" wide and 6" to 24" long, (b) feeding said identical width and length size strips of veneer to a butt jointer to fasten together said strips of veneer at their shortest dimension to form a continuous ribbon of veneer, and (c) forming a plurality of continuous ribbons of veneer and subsequently running said plurality of ribbons side-by-side and joining together said continuous ribbons of veneer by an edge banding jointer to form a continuous sheet of glued up face veneer wherein the continuous sheet of glued up face veneer is formed with continuous strips of identical size pieces that may be matched up with or staggered relative to other continuous strips of identical size pieces to form a uniform geometric pattern in the finally formed continuous sheet.

2. A process for salvaging scrap veneer as set forth in claim 1 wherein the continuous sheet of glued up face veneer is cut into individual pieces which are then subsequently fastened to an appropriate backing material.

* * * * *